United States Patent [19]

Edminster

[11] Patent Number: 4,715,757

[45] Date of Patent: Dec. 29, 1987

[54] ATTACHMENT APPARATUS AND METHOD FOR ATTACHING

[75] Inventor: Robert E. Edminster, Scottsdale, Ariz.

[73] Assignee: Motorola, Inc., Schaumburg, Ill.

[21] Appl. No.: 656,800

[22] Filed: Oct. 1, 1984

[51] Int. Cl.[4] ............................................. F16B 35/01
[52] U.S. Cl. .................................... 411/411; 411/422; 411/221; 411/987
[58] Field of Search ................ 411/411, 422, 55, 221, 411/987; 151/57

[56] References Cited

U.S. PATENT DOCUMENTS 4,093,011  6/1978  Bucknavich ........................ 151/57

Primary Examiner—Peter A. Nelson
Attorney, Agent, or Firm—Lowell W. Gresham

[57] ABSTRACT

An apparatus which attaches a first device within a cavity of an anchor without using inserts, flanges, or adhesives is disclosed. Flexibility in positioning the device relative to the anchor is provided regardless of whether the anchor cavity or the device is threaded. A keeper having two rows of teeth, each row being substantially perpendicular to the threads, is mounted between the device and anchor and rotates under a force exerted by a pin so that only one of the two rows engages the thread channels. The force exerted by the pin also causes the keeper to pivot about a pivot end which is specifically shaped to prevent binding upon removal of the device from the cavity.

18 Claims, 2 Drawing Figures 4,715,757

ATTACHMENT APPARATUS AND METHOD FOR ATTACHING

STATEMENT OF GOVERNMENT INTEREST

The invention described herein may be manufactured and used by the Government of the United States of America for governmental purposes without the payment of royalties thereon or therefor.

BACKGROUND OF THE INVENTION

The present invention relates generally to the attachment of one object within a cavity of another object. Specifically, the present invention relates to locking the two objects together when one of the objects may be threaded. More specifically, the present invention permits flexibility in alignment of one object with the other regardless of a particular thread crest position.

One technique for attaching a first object within a second object having a cavity is to incorporate a flange on the first object which is too large to fit through the opening to the cavity. A substantial portion of the first object engages the cavity, but the flange overlaps the opening to the cavity and remains outside the second object. Any number of suitable fasteners may then affix the first object's flange to the outside of the second object. However, this technique is limited to applications where sufficient room exists outside the second object to accommodate the flange portion of the first object.

Another technique for attaching a first object within a cavity in a second object concerns threading. Mated screw threads are formed on the first object and on a cavity wall of the second object. The two objects are attached together by screwing the first object into the second object until the first object is sufficiently locked in place.

This technique may be effective where insufficient room exists outside the second object to accommodate a flange, but is still limited to applications where the cavity is circular in cross sectional area and where the screw threads on the first and second objects are in good shape. Furthermore, controlling the precise angular beginning and depth of threads formed on either the first or second objects may be difficult. Thus, the threading technique is further limited to applications which can tolerate a certain amount of variation in the relative angular orientation of the first object within the cavity of the second object, and the depth to which the first object is displaced within the second object.

Still another technique for attaching a first object within a cavity of a second object uses a suitable adhesive. However, attachment with adhesives is limited to applications where suitable adhesives exist and where removal of the first object from the cavity is not anticipated.

Yet another technique for attaching a first object within a second object having a cavity uses a combination of threading and various inserts. An insert placed inside the cavity may expand as the first object is screwed into it causing attachment of the first object by clamping forces exerted through the deformed insert and against the cavity walls. Alternatively, a slip ring surrounding the first object may be screwed into a threaded cavity also causing attachment through clamping. Since clamping forces are used to attach the two objects together, this technique provides more flexibility in alignment. However, special tools permitting the exertion of great forces on the first and second objects are often required, inserts may not be reusable, and the additional required slip rings and inserts are easily lost.

Accordingly, the present invention provides an attachment apparatus that permits the attachment of a first object within a cavity of a second object without the use of flanges, inserts, or adhesives. Thus, the present invention allows the first object to be mounted entirely within the cavity, does not require the use of components which may be wasted or lost, and permits a multiplicity of removals and re-attachments.

The present invention addresses concerns about the ease of attachment of the first object within the cavity of the second object. Accordingly, the present invention allows mounting the first object within the cavity of the second object without the use of special tools or the application of large forces.

Another facet relates to permitting flexibility in both the angular alignment of the first object relative to the second object and the depth the first object is displaced within the second object. Thus, the present invention may be adapted for use with threading techniques, but it compensates for alignment problems which are characteristic of threading techniques.

The present invention additionally places minimum requirements on the shape of the first object or the cavity in the second object. Consequently, the present invention may be employed with cavities which are not circular in cross-section. Further, if the present invention is used with a threading technique, it remains operative in spite of rusty or damaged threads.

Moreover, the present invention need not damage threads which may exist on either the first or second objects. For example, the present invention may be installed on a first object which substitutes for a plug-like object where the plug-like object screws into a cavity in a second object. The first object which incorporates the present invention may attach within the cavity without damaging the cavity threads and limiting future use of the plug-like object.

Further the present invention indicates by a simple inspection whether the first object is locked within the second object. Unlike adhesive and insert techniques, an installer of an object incorporating the present invention may ascertain that the object is in fact attached without testing the object's resistance to being removed.

SUMMARY OF THE INVENTION

The above and other objects and advantages of the present invention are carried out in one form by an apparatus which includes a keeper positioned on an outward side of a first object which is to be attached within a cavity of a second object. The keeper contains at least one tooth, which protrudes outwardly from the first object, and a pin receptacle. A pin couples to the first object so that the pin can move relative to the first object, engage the keeper at the pin receptacle, impart a force to the keeper, and cause the keeper tooth to move outward. As the keeper tooth moves outward it contacts the second object within the cavity and causes the first object to become attached.

BRIEF DESCRIPTION OF THE DRAWINGS

A more complete understanding of the invention and a fuller appreciation of the many advantages thereof will be readily derived by reference to the detailed description and claims when considered in connection with the accompanying drawings, wherein:

DETAILED DESCRIPTION

Figure 1:
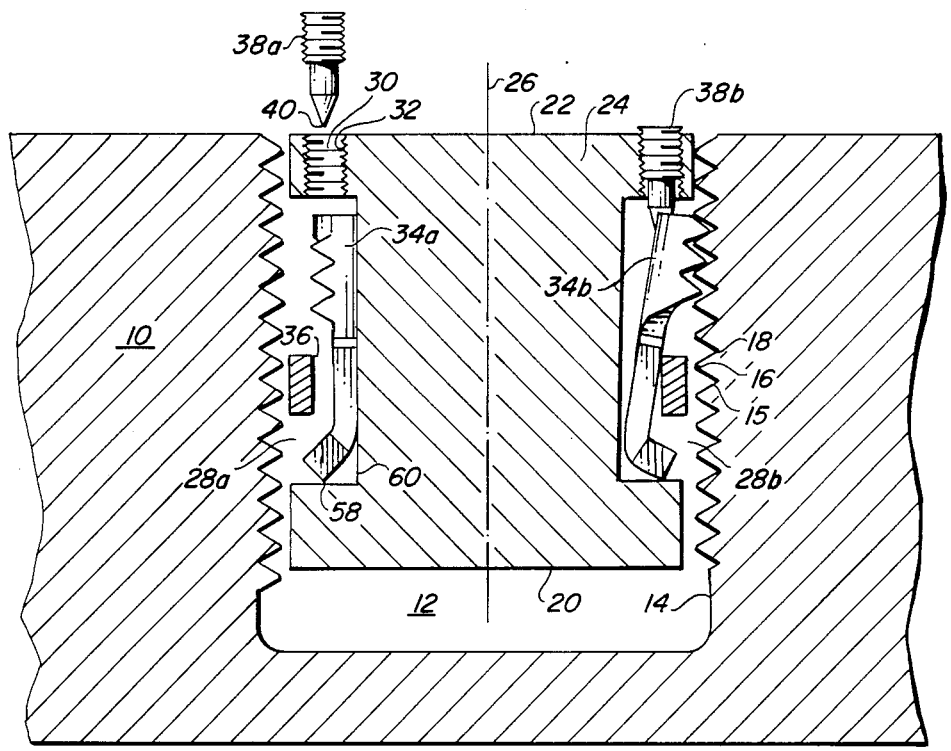
FIG. 1 shows a cross-sectional view of one embodiment of the present invention.

The cross-sectional view shown in FIG. 1 illustrates the cooperation of the various portions of one embodiment of the present invention. An anchor 10 contains a cavity 12 therein. Cavity wall 14 forms the boundary between anchor 10 and cavity 12. In this specific embodiment cavity wall 14 has a screw thread 15 having a predetermined pitch formed thereon. Screw thread 15 contains thread crests 16 which represent the portions of screw thread 15 which are nearest the inside of cavity 12, and thread channels 18 which are furthest from the inside of cavity 12.

Cavity 12 holds a device 20. Thus, anchor 10 and screw thread 15 surround device 20. An outward facing surface 22 represents a section of device 20 which faces the outside of anchor 10, and a body 24 represents a section of device 20 which is enclosed between surface 22 and cavity wall 14. Surface 22 and body 24 have a common axis, represented as axis 26 in FIG. 1.

A side of device 20 which faces cavity wall 14 contains keeper chambers 28a and 28b. Additionally, device 20 contains cylindrical holes 30 extending from the head of device 20 to keeper chambers 28. In this embodiment screw threads 32 have been formed on the walls of cylindrical holes 30.

Device 20 holds keepers 34a and 34b within keeper chambers 28a and 28b respectively so that keepers 34 mount between device 20 and anchor 10. Keepers 34 represent a specially shaped beam or platform which is substantially parallel to axis 26. It serves as a locking mechanism in the attachment of device 20 within cavity 12 and is discussed in more detail in connection with FIG. 2 hereinbelow.

Straps 36 attach to device 20 and retain keepers 34 within keeper chambers 28. Although keepers 34 are retained within keeper chambers 28, straps 36 permit sufficient movement to allow keepers 34 to contact cavity wall 14. FIG. 1 shows keeper 34a in an unlocked position where it is entirely contained within keeper chamber 28a. FIG. 1 additionally shows keeper 34b in a locked position where a portion of keeper 34b has been moved outside of keeper chamber 28b causing keeper 34b to contact cavity wall 14.

A pin 38 mates with cylindrical hole 30. Thus, a thread corresponding to screw thread 32 is formed around the outside of pin 38. Pin 38 has an engagement end 40 which is tapered in this embodiment. As pin 38 is screwed into cylindrical hole 30, engagement end 40 contacts keeper 34. As pin 38 is further screwed into cylindrical hole 30, a force is exerted upon keeper 34 in a direction that causes keeper 34 to move outward from device 20. The taper at engagement end 40 is one factor in causing this force to be directed outward. As pin 38 is screwed still further into cylindrical hole 30, keeper 34 contacts cavity wall 14 where keeper 34 reaches a locked position. A person may observe that device 20 is locked in position by inspecting the position of pin 38 relative to surface 22 and need not test the resistance of device 20 to removal.

Figure 2:
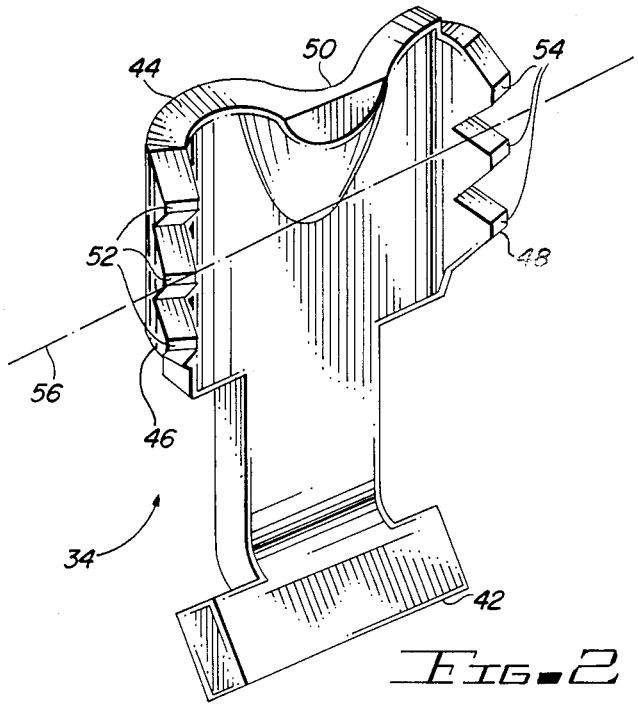
FIG. 2 shows an enlarged perspective view of a keeper portion of one embodiment of the present invention.

FIG. 2 shows an enlarged view of keeper 34. Keeper 34 represents a generally planar platform having four ends or sides and having various features which protrude away from the planar surface of the platform. A pivot end 42 opposes a toothed end 44. Both pivot end 42 and toothed end 44 are generally parallel to a transverse axis shown as axis 56 in FIG. 2. When keeper 34 is in the locked position, toothed end 44 represents that end of keeper 34 which contacts cavity wall 14. Keeper 34 pivots around pivot end 42 as it moves between the locked and unlocked positions.

First opposed side 46 and second opposed side 48 connect pivot end 42 with toothed end 44. When keeper 34 is installed within keeper chamber 28, both first opposed side 46 and second opposed side 48 are generally paralled to axis 26, as shown in FIG. 1.

The toothed end section of first opposed side 46 contains first teeth 52, and the toothed end section of second opposed side 48 contains second teeth 54. Teeth 52 and 54 protrude away from the planar surface of keeper 34 so that when keeper 34 is installed within keeper chamber 28 teeth 52 and 54 face cavity wall 14.

The shape and size of teeth 52 and 54 correspond to requirements set by the predetermined pitch of screw thread 15 formed in cavity wall 14. The distance between the tips of each tooth of teeth 52 and between each tooth of teeth 54 is equivalent to the distance between thread channels 18 on screw thread 15. This shape and size allows the tips of the teeth to engage the thread channels on screw thread 15 when keeper 34 is in the locked position.

In this embodiment, teeth 52 are shifted in position along opposing side 46 from the position of teeth 54 on opposing side 48. Thus, the shift is along a line which is substantially parallel to axis 26 when keeper 34 is installed within keeper chamber 28. Teeth 54 are positioned toward pivot end 42 a distance equivalent to one-half the pitch of screw thread 15. Accordingly, if a tip of one tooth from teeth 52 lies on transverse axis 56, then a point half way between two of the teeth 54 also lies on transverse axis 56.

The shifted position of teeth 52 from teeth 54 aids the alignment of device 20 with anchor 10. As pin 38 engages keeper 34 causing keeper 34 to contact cavity wall 14, either teeth 52 or teeth 54 contact cavity wall 14 before the other set of teeth. This first contact occurs because the tips of the contacting teeth will be aligned so that they are nearer thread crests 16 than are the non-contacting teeth. On the other hand, the tips of the non-contacting teeth will be more closely aligned with thread channels 18. As pin 38 causes keeper 34 to move closer toward cavity wall 14, keeper 34 rotates about the contacting teeth until the non-contacting teeth mentioned above also contact cavity wall 14 near thread channels 18.

At this point device 20 is locked in place within cavity 12 because thread crests 16 block removal of the tips of the teeth which contact thread channels 18. The rotation of keeper 34 to select the alternate tooth, which is more closely aligned with thread channels 18, for contact with thread channels 18 prevents the displacement of device 20 within cavity 12 from becoming altered. The rotation also obviates the exertion of large forces against cavity wall 14. Since large forces are not needed to lock device 20 into cavity 12, special installation and removal tools are not needed and screw thread 15 is not damaged.

In this embodiment pivot end 42 is displaced away from the planar surface of keeper 34 in the same direction as teeth 52 and 54. In this specific embodiment the tips of teeth 52 and 54 and pivot end 42 define a plane which is substantially parallel to the planar surface of keeper 34.

Since pivot end 42 protrudes away from the planar surface of keeper 34, keeper 34 pivots around a point 58 inside keeper chamber 28 which is near the outside surface of device 20 rather than near an inside wall 60 of keeper chamber 28. The positioning of pivot end 42 aids removal of device 20 from cavity 12 because it prevents keeper 34 from binding against the inside wall of keeper chamber 28 to hold device 20 in place after pin 38 has been loosened.

Keeper 34 additionally contains a ramp 50 centrally located at toothed end 44 of keeper 34. Ramp 50 also protrudes away from the planar surface of keeper 34 in the same direction as teeth 52 and 54 at toothed end 44. However, ramp 50 slants toward the planar surface of keeper 34 as it extends toward the interior of keeper 34. When keeper 34 is installed in keeper chamber 28, ramp 50 slants inward toward the interior of body 24 of device 20 and away from surface 22 of device 20.

Ramp 50 serves as a receptacle for pin 38 because it defines the position where pin 38 engages keeper 34. Ramp 50 additionally alters the direction of forces exerted by pin 38 on keeper 34 so that keeper 34 can move in the direction of cavity wall 14.

In the present embodiment keeper 34 is constructed from a hardened material so that it does not easily deform when pin 38 causes it to contact cavity wall 14 or upon removal of device 20 from cavity 12.

Although the foregoing uses one specific embodiment to describe the present invention, those skilled in the art will be able to apply the teachings of the present invention to many alternate embodiments which are intended to be included within the scope of the present invention.

For example, one possible alternate embodiment does not require threads on either device 20 or cavity wall 14. In this first alternate embodiment cavity wall 14 is constructed from a softer material than keeper 34. The tips of the teeth on keeper 34 impale cavity wall 14 when keeper 34 is in the locked position thereby causing device 20 to become attached to anchor 10.

A second alternate embodiment might use a threaded device 20, but an unthreaded cavity wall 14. In this second alternate embodiment keeper chamber 28 is located in cavity wall 14, and keeper 34, strap 36, cylindrical hole 30, and pin 38 are all associated with anchor 10 instead of device 20 as shown in FIG. 1.

A third alternate embodiment might replace strap 36 with any suitable retainer or mounting apparatus. As described above, keeper 34 both pivots about pivot end 42 and rotates to select either teeth 52 or teeth 54 for contact with thread channels 18. A retaining or mounting apparatus, such as loose fitting rivets or bolts, that permits this pivoting and rotation may suitably retain keeper 34.

A fourth alternate embodiment might alter the cooperation of ramp 50 and pin 38. For example, cylindrical hole 30 may be slanted instead of ramp 50. In this example keeper 34 does not need a feature which alters the direction of force exerted by pin 38 onto keeper 34 nor does engagement end 40 of pin 38 need to be tapered because the force exerted along the axis of pin 38 contains a directional component that causes keeper 34 to move toward cavity wall 14. Hence, keeper 34 needs only a receptacle for pin 38, such as a relatively small depression in the planar surface of keeper 34.

A fifth alternate embodiment might incorporate a different technique for moving pin 38 relative to device 20. A ratcheting mechanism represents one different technique where force applied along the axis of pin 38 causes pin 38 to move relative to device 20 and remain in position after the force is removed.

A sixth alternate embodiment might utilize a different number of keepers 34. Although the embodiment shown in FIG. 2 shows two keepers 34, the present invention is not limited to that particular quantity. For example, some applications may achieve a sufficient degree of attachment through the use of only one keeper 34. Other applications may require more than two keepers 34. If more than two keepers 34 are used, then the amount of shift between teeth 52 and teeth 54 may advantageously match the distance between adjacent thread crests 16, measured parallel to axis 26, divided by the number of keepers 34. Thus, the shift compensates for the pitch of screw thread 15 over a distance between two adjacent keepers 34.

What is claimed is:

1. An attachment apparatus comprising:
   a device having an outward facing surface and a body formed around a common axis;
   an anchor surrounding the body of said device;
   a pin having a pin axis; and
   a keeper positioned on the outward side of the body of said device, said keeper having
   a tooth protruding outwardly from the body of said device, and
   means, integral with said keeper, for receiving said pin so that upon engagement of said pin with said receiving means said pin transmits force to said keeper in a direction which causes said keeper tooth to move outwardly from the body of said device.

2. An apparatus as claimed in claim 1 additionally comprising:
   a second pin; and
   a second keeper positioned on the outward side of the body of said device, said second keeper having
   a second keeper tooth protruding outwardly from the body of said device, and
   means, integral with said second keeper, for receiving said second pin so that upon engagement of said second pin with said second receiving means force is transmitted from said second pin to said second keeper in a direction which causes said second keeper tooth to move outwardly from the body of said device.

3. An apparatus as claimed in claim 2 wherein:
   a screw thread having a predetermined pitch and a thread channel is formed on said anchor so that said screw thread surrounds the body of said device;
   said keeper tooth contacts said anchor at the thread channel; and
   said second keeper tooth contacts said anchor at the thread channel.

4. An apparatus as claimed in claim 3 wherein:
   said keeper additionally comprises a second tooth protruding outwardly from the body of said device, said second tooth located on said keeper so that said pin receiving means is positioned between the keeper tooth and said keeper second tooth; and said second keeper additionally comprises a second tooth protruding outwardly from the body of said device, said second keeper second tooth located on said second keeper so that said second pin receiving means is located between the second keeper tooth and said second keeper second tooth.

5. An apparatus as claimed in claim 4 wherein:
the position of the keeper tooth is shifted relative to the position of the keeper second tooth along a line substantially parallel to the common axis;
the position of the second keeper tooth is shifted relative to the position of the second keeper second tooth along a line substantially parallel to the common axis.

6. An apparatus as claimed in claim 5 wherein the amount of shifting between the keeper tooth and said keeper second tooth compensates for the pitch of the screw thread of said anchor and the distance between said keeper and said second keeper.

7. An apparatus as claimed in claim 1 wherein:
said keeper forms a beam having a pivot end about which said keeper pivots as said pin movement means causes the keeper tooth to contact said anchor; and
the keeper pivot end protrudes outwardly from the body of said device.

8. An apparatus as claimed in claim 1 wherein:
said device contains a cylindrical hole extending from the outward facing surface to the position of said keeper on said device;
a screw thread is formed around the cylindrical hole; and
a corresponding screw thread is formed on said pin so that movement of said pin occurs through rotational motion of said pin about the pin axis and relative to said device.

9. An apparatus as claimed in claim 1 wherein the outward side of the body of said device has a chamber therein for holding said keeper.

10. An apparatus as claimed in claim 1 additionally comprising a plurality of teeth wherein each tooth of said plurality of teeth protrudes outwardly from the body of said device.

11. An apparatus as claimed in claim 1 wherein said pin receiving means comprises a ramp slanting inwardly toward the body and away from the outward facing surface of said device.

12. An apparatus as claimed in claim 11 wherein:
said pin has an engagement end for engaging said ramp; and
said pin engagement end is tapered.

13. A method for attaching a device having an outward facing surface and a body formed around a common axis, the attachment being to a surrounding anchor, said method comprising the step of:
moving a pin relative to the device;
engaging a keeper with the pin of said moving step, the keeper being located on an outward side of the body of the device and having a tooth projecting outwardly from the body;
pivoting the tooth of the keeper about a keeper pivot end outward from the outward side of the body of the device upon engagement of the pin with the keeper through deflection of a force applied to the keeper from the pin; and
joining the keeper tooth of said engaging step to the surrounding anchor in response to said pivoting step.

14. A method as claimed in claim 13 additionally comprising the step of forming a screw thread on the anchor so that the keeper tooth of said engaging step contacts a thread channel of the screw thread in said joining step.

15. A method as claimed in claim 14 wherein:
the keeper of said engaging step contains two teeth shifted from each other along a line substantially parallel to the common axis; and
the method additionally comprises the step of rotating the keeper so that said joining step joins a one of the two shifted teeth which is most closely aligned with the thread channel.

16. A method as claimed in claim 13 additionally comprising the step of positioning the pivot end of the keeper from said pivoting step so that the pivot end protrudes outwardly from the body of the device.

17. An apparatus for locking a first device to a second device, the second device having a screw thread formed thereon, and the first and second devices juxtaposed so that one of the first and second devices surrounds the other of the first and second devices, the apparatus comprising:
a first planar platform having first and second opposing sides, a pivot end, and a toothed end, said first platform having a first tooth protruding away from the plane of said first platform and located proximate the toothed end and first side of said first platform, and having a second tooth protruding away from the plane of said first platform and located proximate the toothed end and second side of said first platform, the first tooth and second teeth being shifted relative to each other along the first and second sides;
means for mounting said first platform between the first and second devices so that
the first and second teeth of said first platform face the second device,
said first platform is retained by the first device,
said first platform is permitted to rotate so that one of the first and second teeth rotates toward the second device about the other of the first and second teeth, and
said first platform is permitted to pivot so that both the first and second teeth move together toward and away from the second device;
means for pivoting said first platform about the pivot end of said first platform;
a second planar platform having first and second opposing sides, a pivot end, and a toothed end, said second platform having a first tooth protruding away from the plane of said first platform and located proximate the toothed end and the first side of said second platform, and having a second tooth protruding away from the plane of said second platform and located proximate the toothed end and the second side of said second platform, the first tooth and the second tooth being shifted relative to each other along the first and second sides;
means for mounting said second platform between the first and second devices so that;
the first and second teeth of said second platform face the second device,
said second platform is retained by the first device,
said second platform is permitted to rotate so that one of the first and second teeth move toward the second device about the other of the first and second teeth, and said second platform is permitted to pivot so that both the first and second teeth move together toward and away from the second device; and means for pivoting said second platform about the pivot end of said second platform.

18. An apparatus as claimed in claim 17 wherein the pivot end of said first platform protrudes away from the plane of said first platform in substantially the same direction as the first tooth and second tooth of said first platform.

* * * * *